United States Patent Office 2,717,877
Patented Sept. 13, 1955

2,717,877

ANTISTATIC COMPOSITIONS

Emil A. Vitalis, Springdale, Conn., assignor to American Cyanamid Company, New York, N. Y., a corporation of Maine No Drawing. Application September 10, 1952,
Serial No. 308,916

13 Claims. (Cl. 252—8.7)

This invention relates broadly to new and useful antistatic compositions. More particularly the invention is concerned with antistatic compositions comprising (I) an antistatic agent which is a salt, more particularly an inorganic salt, e. g., magnesium chloride, nitrate and chromate, magnesium acid phosphate, strontium chloride and nitrate, zinc chloride, calcium chloride, etc., and (II) a salt which is an addition product of (1) a bisulfite and (2) a polyester of the kind hereafter defined, the ingredients of (I) and (II) being present in the said antistatic composition in weight percentages of from about 5 to 97% of the former to from about 95 to 3% of the latter.

The salt of (II) that is an essential component of the antistatic compositions of the present invention is more fully described (including method of preparation) and is broadly and specifically claimed in the copending application of Joseph J. Carnes and Richard K. Madison, Serial No. 308,940, filed concurrently herewith, now Patent No. 2,698,856 dated January 4, 1955. These salts are addition products of (1) a bisulfite (including meta-bisulfite), more particularly a water-soluble bisulfite, or the equivalent of a bisulfite, and (2) a polyester which is a condensation product of (A) a glycerol ester, more particularly a fatty acid monoglyceride or diglyceride or a mixture thereof, wherein the fatty acid component thereof contains at least 8 carbon atoms, with (B) an esterification product of (a) an aliphatic dihydroxy compound, more particularly an alkylene glycol or a polyoxyalkylene glycol, and (b) an ethylenically unsaturated dicarboxylic compound selected from the class consisting of ethylenically unsaturated dicarboxylic acids and anhydrides thereof. The ethylenically unsaturated grouping of the aforementioned dicarboxylic compound is alpha to a carbonyl group, and the reactants of (a) and (b) are employed in a molar ratio of 1 mole of the former to about 2 moles of the latter. The glycerol ester of (A) and the esterification product of (B) are employed in a molar ratio of about 2 moles of the former to 1 mole of the latter. The molar ratio of the glycerol ester of (A) and the esterification product of (B) may be a little more or a little less than 2 moles of the former to 1 mole of the latter, e. g., from 1.9 to 2.1 moles of the glycerol ester of (A) to 1 mole of the esterification product of (B). (As will be understood by those skilled in the art, the molecular weight of such glycerol esters as the monoglyceride or diglyceride, or mixtures thereof, of fatty acids derived from tallow, cottonseed oil and other vegetable and animal oils and fats is difficult to determine with great exactness so that usually only approximate molecular weights can be obtained, and this is reflected in the molar ratios.) Similarly, the molar ratio of the ethylenically unsaturated dicarboxylic compound and the aliphatic dihydroxy compound may be a little more or a little less than 2 moles, e. g., from 1.9 to 2.1 moles of the former to 1 mole of the latter.

It was suggested prior to my invention that antistatic compositions comprising an inorganic salt be used for treating textile materials that readily acquire and retain an electrostatic charge in order to impart antistatic characteristics thereto. For example, in Dreyfus Patent No. 2,086,544 it is suggested that various hygroscopic or deliquescent solids, more particularly electrolytes such as various organic and inorganic salts (among which the chlorides and nitrates of magnesium, calcium and zinc specifically are mentioned), be dissolved in an alcoholic medium, e. g., methyl or ethyl alcohol or mixtures of water and an alcohol, and that the resulting solution be applied to staple fibers composed of or containing cellulose ester or ether filaments in order that the staple might be spun into yarn without difficulty due to the accumulation of electrostatic charges. It is further disclosed in this Dreyfus patent that the alcoholic solution of the electrolyte also may contain a lubricant, e. g., a fatty oil or a light or heavy mineral oil; and that, in conjunction with the application of the alcoholic solution, there also may be applied to the staple a softener or swelling agent which functions to increase the flexibility of the filaments, e. g., triacetin, the monomethyl and monoethyl ethers of ethylene glycol and the diethyl ether of diethylene glycol.

In Whitehead Patent No. 2,086,590 it is suggested that electrolytes, such as those disclosed in the aforementioned Dreyfus patent, be dissolved in a solvent of relatively high boiling point, e. g., ethylene glycol, diethylene glycol, glycerol and diacetone alcohol, and that the resulting solution be applied to, or incorporated in, staple fibers made of organic derivatives of cellulose, such as organic esters of cellulose and cellulose ethers, in order to reduce the tendency of such fibers to generate static electricity during the spinning operation. Also, in my Patents 2,562,154, –5, –6 and 2,567,159 I have disclosed and claimed wetting and detergent compositions containing a higher monoalkyl sulfosuccinate and various water-soluble inorganic salts, among which magnesium nitrate and chloride specifically are mentioned, as a solubilizing agent for the aforementioned sulfosuccinate.

The present invention is based on my discovery that antistatic compositions of the kind described briefly in the first and second paragraphs of this specification possess an unobvious combination of properties which renders them eminently suitable for the treatment of a wide variety of textile materials, e. g., in the form of continuous-filament yarn, staple fiber, tow, roving, knitted, woven or felted fabrics, and which may be composed of or contain fibers or filaments of wool, silk, cellulose esters (e. g., cellulose acetate, cellulose acetobutyrate, cellulose formate, cellulose propionate, cellulose butyrate, etc.), cellulose ethers (e. g., ethyl cellulose, benzyl cellulose, etc.), viscose rayons, nylon, thermoplastic vinyl resins (e. g., vinyl chloride polymers and copolymers, acrylonitrile polymers and copolymers, etc.), and other natural and synthetic textiles in fiber, fabric or other form. For example, the compositions of this invention have both a softening and lubricating action on the textile and, in addition, have the ability to retard or obviate the accumulation of static charges of electricity on such textiles which normally tend to become charged with static electricity. This is a matter of considerable practical importance since both continuous-filament yarn and staple fibers are subjected to processes wherein softness and/or good lubricity are prime requisites. Furthermore, in many such processes the fibers, by reason of their constitution, develop and retain static charges of electricity that interfere with the processing operations.

The aforementioned and other difficulties are obviated by the use of the compositions of this invention which provide static control with good static durability under low-humidity conditions or even in the complete absence of moisture. They also provide good static control at elevated temperatures. Furthermore, despite the fact that they contain a salt, more particularly a water-soluble inorganic salt (including those which normally form large, sharp crystals) the compositions appear to have no deleterious effect on textile equipment nor do they abrade, tear or shred the fiber during carding, drawing or other processing operations. Additionally, they can be applied to freshly spun fibers or filaments, including those which have been produced by a wet-spinning process and are still in a gel state (e. g., an aquagel or hydrogel state), without any apparent deleterious effect upon the structure of the fiber. These results were quite surprising and unexpected and in no way could have been predicted either from the known properties of the antistatic inorganic salts or from the known properties of the modifying salt and which is characterized by having two different ester groups combined with an unsubstituted or substituted aliphatic sulfodicarboxylic acid radical, and by the further fact that it preferably has two of such acid groups per molecule.

I have found that salts (bisulfite-addition products) of the kind disclosed and claimed in the aforementioned Carnes et al. copending application Serial No. 308,940 coact with the antistatic inorganic salt component of my antistatic compositions so as to modify, as to size, shape or hardness, any crystal or crystals of the said inorganic salt that normally might tend to form or be deposited upon volatilization of the solvent in which the salt is dissolved; or, in some cases, so as to prevent crystal formation completely. The latter represents the optimum condition to be attained and is generally secured when the preferred inorganic salts (e. g., those specified in the first paragraph of this specification) are employed in the optimum weight ratios with the crystal growth-inhibiting modifier. Under less favorable conditions, the normal tendency of the antistatic inorganic salt to form relatively large crystals, and which also may be relatively sharp or abrasive, can be modified or controlled so that crystals having a maximum average particle size of about 5 microns are present in the composition. Such sizes are near the lower limit of the resolving power of light microscopes. Such small crystals are relatively soft (substantially non-abrasive) and appear to have no harmful effect upon textile equipment or upon the fiber that is being processed. Also, the modifying bisulfite-addition product has a softening and lubricating effect upon the textile undergoing treatment and itself is able to impart some antistatic properties to the textile.

Of the aforementioned bisulfite-addition products, the preferred class is composed of those which are represented by the following general formula:

I

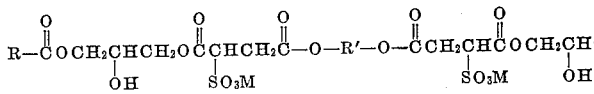

where R represents an aliphatic radical containing at least 7 carbon atoms, R' represents a divalent aliphatic or other organic radical containing at least 2 carbon atoms, more particularly (a) an alkylene radical containing at least 2 carbon atoms, e. g., ethylene, propylene, butylene, pentylene, hexylene, heptylene, octylene, nonylene to octadecylene, inclusive, or (b) a polyoxyalkylene radical, more particularly such a radical represented by the general formula II     $-CHR''(CH_2OCHR'')_nCH_2-$ where R'' represents hydrogen or a methyl radical and $n$ represents a number between 1 and about 135, and M is a salt-forming cation.

Examples of salt-forming cations represented by M in the above formula are any of the alkali metals, ammonium, polyvalent metals (e. g., barium, strontium, calcium, magnesium, etc.) or those derived from organic bases such, for instance, as methyl, ethyl, propyl and butyl amines, dimethyl, diethyl, dipropyl and dibutyl amines, mono-, di- and triethanol amines, as well as other higher aliphatic and hydroxy-aliphatic amines, guanylurea, guanidine, hydroxyethylguanidine, biguanide, aryl amines, e. g., aniline, etc., aralkyl amines, e. g., benzyl amine, etc., alkaryl amines, e. g., toluidine, etc., and heterocyclic bases, e. g., nicotine, pyridine, quinoline, alkaloids, etc.

Illustrative examples of aliphatic radicals represented by R in Formula I are heptyl, octyl, octenyl, nonyl, decyl, decenyl, undecyl, undecenyl, tridecyl, pentadecyl, heptadecyl, heptadecenyl, nonadecyl, heneicosyl, heneicosenyl, tricosyl, etc.

The reactions involved in the preparation of the bisulfite-addition products that are used in producing the antistatic compositions of the present invention are (A) esterification, (B) condensation and (C) sulfonation at the double bonds of the condensation product of (B) with a bisulfite, more particularly a water-soluble bisulfite. Equations for these reactions are given in the aforementioned Carnes et al. copending application Serial No. 308,940 and wherein ethylene glycol is taken as illustrative of the aliphatic dihydroxy compound, maleic anhydride as illustrative of the ethylenically unsaturated dicarboxylic compound, a fatty acid monoglyceride as illustrative of the glycerol ester and sodium bisulfite as illustrative of the bisulfite.

In forming these bisulfite-addition products, one can use maleic anhydride or other ethylenically unsaturated dicarboxylic acid or available anhydrides thereof, and wherein the ethylenically unsaturated group is alpha to a carbonyl group, for instance fumaric, citraconic, itaconic or mesaconic acids or their available anhydrides. The preferred dicarboxylic compound is maleic anhydride, although maleic acid or fumaric acid likewise can be employed to produce a product containing sulfosuccinic groupings.

Instead of using ethylene glycol as the aliphatic dihydroxy compound in forming the bisulfite-addition product, one can use other simple alkylene glycols, e. g., propylene, butylene, pentylene, heptylene, hexylene, octylene, nonylene to octadecylene (and higher) glycols and wherein the alkylene grouping is either straight or branched chain; the polyoxyalkylene glycols, or polyalkylene glycols as they are perhaps more commonly designated, e. g., diethylene glycol, triethylene glycol, dipropylene glycol, tripropylene glycol and the higher polymers of the lower alkylene glycols; as well as others. The polymers of the lower alkylene glycols are available in a variety of average molecular weights ranging from approximately 200 up to 6000 and higher. Some of the more generally available of these polymeric lower-alkylene glycols are listed below with their commercial designations, together with their average molecular weights:

| Polyalkylene Glycol | Average Molecular Weight |
|---|---|
| Polyethylene glycol 200 | 190–210 |
| Polyethylene glycol 300 | 285–315 |
| Polyethylene glycol 400 | 380–420 |
| Polyethylene glycol 600 | 570–630 |
| Polypropylene glycol 150 | 140–160 |
| Polypropylene glycol 425 | 400–450 |
| Polypropylene glycol 750 | 700–800 |
| Polypropylene glycol 1025 | 975–1,075 |
| Polypropylene glycol 1200 | 1,150–1,250 |
| Polypropylene glycol 2025 | 1,950–2,100 |
| "Carbowax" compound 1000 | 950–1,050 |
| "Carbowax" compound 1540 | 1,300–1,600 |
| "Carbowax" compound 4000 | 3,000–3,700 |
| "Carbowax" compound 6000 | 6,000–7,500 |

The above "Carbowax" compounds are wax-like polyethylene glycols having the aforementioned average molecular weights. These polyalkylene (polyoxyalkylene) glycols contain residues or radicals which can be expressed by the general formula hereinbefore given with reference to Formula I. When $n$ in that formula represents about 135, a typical example of a polyoxyalkylene glycol employed to get the final product represented by Formula I would be "Carbowax" compound 6000. Unlike other "Carbowax" compounds, "Carbowax" compound 1500 is a blend of about equal parts of polyethylene glycol 300 and "Carbowax" 1540, and has an average molecular weight of from 500 to 600.

As the glycerol ester which is caused to react with the esterification product of the aliphatic dihydroxy compound (e. g., an alkane diol) and the ethylenically unsaturated dicarboxylic compound, it is preferred to use a monoglyceride of a fatty acid containing at least 8 carbon atoms (particularly those having from 12 to 18 carbon atoms, inclusive). Examples of such glycerol esters are the monoglycerides of caprylic, capric, lauric, myristic, palmitic, stearic, arachidic, behenic, carnaubic, cerotic, montanic and mellissic acids; and oleic, elaidic, isoöleic, rapic, erucic, brassidic, and other unsaturated fatty acids. Such acids are obtainable from and include those derived from vegetable and animal oils and fats, for instance those derived from soya bean oil, cottonseed oil, coconut oil, linseed oil, castor oil, dehydrated castor oil and the like, or from other commercial sources such as talloil. One can also use the diglycerides of a fatty acid (or mixtures of fatty acids) of the kind aforementioned, as well as a mixture of a fatty acid monoglyceride and diglyceride in any proportions.

The condensation reaction between the glycerol ester and the esterification product of the aliphatic dihydroxy compound and the ethylenically unsaturated dicarboxylic compound is preferably continued until at least the theoretical quantity of the water of reaction has been removed.

The sulfonation reaction between the aforementioned condensation product (polyester) and a bisulfite is carried out in accordance with conventional procedure. The bisulfite or meta-bisulfite or mixture thereof in any proportions is preferably employed in a molar ratio corresponding to about 2 moles thereof, or somewhat higher, e. g., up to 3 moles thereof, per mole of the linear polyester condensation product so that one sulfo group is added at each of the two double bonds in the said polyester. If it be desired to add only one sulfo group at one of the double bonds of the polyester, as sometimes may be the case, then as little as 1 mole (or slightly thereabove) of the bisulfite can be employed for each mole of the linear polyester.

From the foregoing it will be seen that M in Formula I is obtained by substantially complete sulfonation of the ethylenically unsaturated polyester with a bisulfite or meta-bisulfite or a mixture thereof, which bisulfite or meta-bisulfite contains a cationic salt-forming substituent of which numerous examples have been given hereinbefore. Preferably the sulfonation is carried out by heating the polyester in a solution of a soluble bisulfite of an organic or inorganic base dissolved in water or a mixture of water and an organic solvent which is miscible therewith, e. g., ethanol. Heating is continued until the desired degree of sulfonation has taken place and the salt corresponding to the bisulfite (including meta-bisulfite) employed has been directly produced.

In addition to the alkali-metal, ammonium and amine salts that readily can be produced by direct sulfonation of the unsaturated polyester with a bisulfite, salts of other bases may be prepared by first acidifying, with a mineral or other strong acid (e. g., HCl), an alcoholic solution of the alkali-metal, ammonium or amine salt, whereby the free polyester of the substituted or unsubstituted aliphatic sulfodicarboxylic acid is obtained, filtering off the inorganic or other salt of the acid used, and reacting the acid polyester with the desired base. Salts of the polyvalent metals such, for instance, as calcium, barium, lead, cadmium and the like may be prepared, if desired, by adding a stoichiometric quantity of an oxide or hydroxide thereof to an alcoholic solution of the acid polyester, followed by stirring until salt formation has been obtained.

The bisulfite-addition products employed in producing the new antistatic compositions of the present invention are preferably those which are readily soluble or dispersible in water. They can be economically produced from commercially available raw materials, and can be easily prepared in a wide range of commercially useful forms (e. g., from viscous liquids to hard, waxy solids) and with solubility and other characteristics which will best meet the special requirements of an antistatic composition for a particular service application.

The antistatic compositions involved herein are produced by mixing together in any suitable manner, salts of the kind briefly described in the first paragraph of this specification and in the weight percentages, with respect to each other, that are there set forth. For example, a liquid antistatic composition containing 2% solids (or any other desired percentage) can be prepared as follows:

To 588 grams of water at 100°–150° F. is added, for instance, 3 grams of a bisulfite-addition product of the kind hereinbefore described, for example a sodium bisulfite- or other bisulfite-addition product of a polyester which is a condensation product of (A) a glyceryl ester comprising glyceryl monostearate and (B) a polyethylene glycol dimaleate comprising mainly tetraethylene glycol dimaleate, or one comprising mainly hexaethylene glycol dimaleate, or one comprising mainly hexamethylene glycol dimaleate, or one comprising mainly nonaethylene glycol dimaleate, or a dimaleate, a difumarate or a diitaconate ester of a polyethylene glycol having an average molecular weight of from 570 to 630, or from 1150 to 1250, or of other alkylene or polyoxyalkylene (polyalkylene) glycols of the ranges of average molecular weights previously mentioned by way of example. The mixture is stirred until the bisulfite-addition product is either completely dissolved or homogeneously dispersed, after which enough of a water-soluble inorganic salt to form a solution or dispersion containing, for instance, 2% (or any other desired percentage) of solids is added thereto, e. g., 10.4 grams of $Mg(NO_3)_2 \cdot 6H_2O$, or an equivalent amount of other water-soluble, antistatic inorganic salts of the kind set forth by way of example in the first paragraph of this specification and elsewhere herein. The mixture is further stirred until a uniform solution or a substantially homogeneous dispersion of the aforementioned ingredients is obtained. The term "dispersion" as used generally hereinafter for purpose of brevity, as well as in certain of the appended claims, is intended to include within its meaning a solution of the ingredients.

For convenience and economy in handling and shipping, these new antistatic substances may be prepared in the form of pastes or paste-like materials which are dilutable with water to form substantially homogeneous antistatic compositions and which comprise the salts of (I) and (II) described in the first paragraph, that is, the antistatic inorganic salt (I) and the bisulfite-addition product (II), and in the weight percentages, with respect to each other, that are there set forth. The aforementioned salts of (I) and (II) and water are preferably present in such paste-like materials in weight percentages of from about 20% to about 65% of the said salts (that is, total salts) to from about 80% to about 35% of water. Typical formulations in the preparation of 25% pastes and 60% pastes are given below by way of illustration and wherein the percentages are by weight:

25% paste

|  | Minimum, Percent | Maximum, Percent | Average, Percent |
|---|---|---|---|
| Bisulfite-addition product | 1.20 | 23.00 | 8.33 |
| Antistatic inorganic salt, preferably magnesium nitrate | 23.80 | 2.00 | 16.67 |
| Water | 75.00 | 75.00 | 75.00 |
| Total | 100.00 | 100.00 | 100.00 |

60% paste

|  | Minimum, Percent | Maximum, Percent | Average, Percent |
|---|---|---|---|
| Bisulfite-addition product | 2.88 | 55.20 | 20.00 |
| Antistatic inorganic salt, preferably magnesium nitrate | 57.12 | 4.80 | 40.00 |
| Water | 40.00 | 40.00 | 40.00 |
| Total | 100.00 | 100.00 | 100.00 |

In the formulations for the above pastes and in other antistatic compositions of this invention, a preferred bisulfite-addition product for many applications is one obtained by addition of a bisulfite to each of the two ethylenically unsaturated bonds of a polyester which is a condensation product of (A) a glyceryl ester comprising glyceryl monostearate and (B) a polyethylene glycol dimaleate comprising mainly nonaethylene glycol dimaleate.

In using the antistatic compositions involved herein, a solution or a dispersion of the composition is applied by any suitable means to the article which, in a dry state, normally has a tendency to accumulate static charges of electricity, followed by drying of the treated article to volatilize the solvent or liquid component. The treatment is applicable to such articles in various forms, for instance in the form of filaments, fibers, yarns, films, woven, knitted and felted fabrics, etc. These antistatic compositions are particularly useful as antistatic finishes for fibers or fabrics composed of or comprising substantial proportions of silk, nylon, wool, viscose rayons, cellulose acetate or other cellulose ester rayons, vinyl resins, including homopolymeric and copolymeric acrylonitrile and other thermoplastic vinyl resins.

As is well known to those skilled in the art, the vinyl resins constitute a class of materials which develop or tend to develop an electrostatic charge upon their surfaces when fibers or other articles made therefrom are subjected to friction during their production and during processing or fabrication of the fibers into fabric or other articles, as well as during the use of the finished article. The antistatic compositions involved herein have been found to be particularly adapted for use in conditioning filaments, fibers, yarns, films and other shaped articles composed of or containing a vinyl resin so as to obviate or minimize their tendency to accumulate static charges of electricity. Examples of vinyl resins, more particularly thermoplastic vinyl resins, which can have antistatic characteristics imported thereto by means of the compositions herein described are polyacrylonitrile, copolymers of acrylonitrile and a different vinyl compound such, for instance, as vinyl chloride, copolymers of vinyl acetate and vinyl chloride, etc. Other examples of vinyl resins to which these antistatic compositions advantageously can be applied are given in, for example, Cresswell Patent No. 2,597,708 dated May 20, 1952, e. g., in column 3, lines 41–75, and column 4, lines 1–51. The preferred vinyl resins that are subjected to treatment with the antistatic compositions herein involved are acrylonitrile polymerization products, especially those which contain a substantial amount, more particularly a preponderant proportion, by weight of combined acrylonitrile.

Antistatic compositions of the present invention may be used and applied at any pH, in the cold, warm or at the boil, and are chemically stable to aging. They may be used alone or with other additives or modifiers, e. g., monoethanolamine, lanolin, morpholine, disodium, phosphates, dialkyl phosphates, alkyl esters of long-chain fatty acids, e. g., the ethyl to amyl, inclusive, esters of fatty acids containing from 12 to 18 carbon atoms, inclusive, conventional wetting and/or dispersing agents, silicone oils, mineral, vegetable and animal oils, etc.

The antistatic compositions with which this invention is concerned not only are capable of imparting antistatic characteristics to vinyl resins (including thermoplastic vinyl resins) and other articles which normally, when dry, have a tendency to accumulate electrostatic charges, but in general they are also able to effect this result without detrimentally affecting the color, tensile strength, elasticity, chemical resistance, bacterial and fungal resistance, and other valuable properties of the vinyl resin; in other words, without rendering the vinyl resin article (or other material that is treated) in any way unsuited for its intended purpose. As a matter of fact, and as has been mentioned hereinbefore, they also beneficially affect the article by imparting softness and lubricity thereto.

The antistatic compositions of this invention are preferably applied to the article to be treated in the form of a liquid dispersion, more particularly an aqueous dispersion. This dispersion may contain any suitable amount of the antistatic composition, but ordinarily the antistatic inorganic salt and bisulfite-addition salt are present in the dispersion in an amount corresponding to from about 0.2% to about 20% by weight thereof of total salts. The dispersion may be applied, for example, by immersing the fiber (or other shaped article formed of vinyl resin or other material) in the dispersion, or by spraying, padding, brushing or otherwise contacting the article with the dispersion. The dispersion may be applied at temperatures ranging from room temperature (20°–30° C.) up to the boiling temperature of the dispersion, e. g., about 100° C., as desired or as conditions may require. Upon drying the fiber or other shaped article at room temperature or at an elevated temperature, e. g., on heated drying rolls, the treated article has the solid antistatic composition deposited at least on the outer surfaces thereof. The amount of antistatic composition which is present in or on the dried, treated material or article may vary considerably, but ordinarily it is present therein or thereon in an amount, by weight, corresponding to from about 0.2% to about 10% of the dried, untreated article.

The finishing compositions with which this invention is concerned advantageously may be applied to fibers of polyacrylonitrile and other vinyl resins, as well as to other articles, in percentages by weight, based on total solids applied to the article, as follows:

|  | Minimum, Percent | Maximum, Percent | Average, Percent |
|---|---|---|---|
| Bisulfite-addition product | 0.05 | 5.0 | 0.5 |
| Antistatic inorganic salt, preferably magnesium nitrate | 0.25 | 3.0 | 1.0 |

In general, no particular advantage appears to accrue when the percentage by weight of the antistatic inorganic salt exceeds more than 3% of the weight of the dry, untreated continuous-filament yarn, staple fiber or other article to which it is applied in order to impart antistatic characteristics thereto. Obviously, the use of higher amounts of the inorganic salt which is applied (in combination with the bisulfite-addition product) to the untreated article is not precluded.

The antistatic compositions herein involved may be applied to, for instance, a shaped thermoplastic vinyl resin, for example, yarns of associated filaments of such a resin, in the course of the production of the yarn or other shaped article, or subsequent to the production of the yarn and before or after any textile operations in which such yarns are used, especially those operations which include or involve a winding operation. By applying the antistatic composition in the course of producing the filaments or fibers, the application may suffice for subsequent textile operations. If desired, however, the textile-treating agent comprising the antistatic composition may be applied both during the process of producing yarns as well as later when these yarns are fabricated into textile fabrics.

The antistatic composition also may be applied to, for instance, thermoplastic vinyl resins or other articles when the latter are in gelled form. For example, I may apply a liquid-treating agent containing the antistatic composition to a fiber in gel state, more particularly an aquagel state, and in which the solid phase comprises, for example, an acrylonitrile polymerization product, more particularly such a product which contains in the molecules thereof an average of at least about 80% by weight of combined acrylonitrile. Thereafter the thusly treated, gelled fiber is dried, for example by continuously passing the fiber over heated drying rolls as is described more fully in, for instance, Cresswell et al. Patent No. 2,558,733 dated July 3, 1951. In this way the applied composition imparts antistatic characteristics to the fiber both during and after drying thereof.

The antistatic compositions herein involved are especially suitable for use in the treatment of water-swollen, oriented or unoriented fibers, films, etc., which have been produced as described in, for example, Cresswell Patents 2,558,730 and 2,558,731 dated July 3, 1951, and in the aforementioned Cresswell et al. Patent No. 2,558,733; also, in the treatment of the dried products, whereby the tendency of the dried material to accumulate static charges of electricity is obviated or minimized and a treated material which, in general, is softer to the touch is obtained.

As has been mentioned hereinbefore, any suitable method may be employed in applying the antistatic composition to the vinyl resin or other base material in fiber, film or other form, and it may be applied at any suitable stage of the production of the shaped article, or during its fabrication into other forms, or to the finished, fabricated article and prior to or during its service use. For example, if the conditioning agent comprising the new antistatic composition is to be applied to the yarn after spinning, the yarn may be brought into contact with a wick, roll or felt which has been wetted with a solution or dispersion containing the antistatic agent dissolved or dispersed in water, ethanol (or other alcohol), a water-ethanol mixture, or other liquid solvent or dispersion media. Alternatively, liquid antistatic composition may be applied by immersing the article in a bath containing the same. Examples of points during the production of a yarn at which the antistatic composition may be applied are during stretching of a wet-spun yarn or fiber to orient the molecules thereof, or between any of the guides or godets or other rolls employed in the spinning process, or between the guide and the point of winding and/or twisting; or, the antistatic composition may be applied after winding onto cones, spools, bobbins or the like; or, in the case of staple fiber manufacture either prior to or after cutting the tow into staple lengths.

For example, a tow of filaments that is to be cut into staple fibers may be treated with a dispersion of the antistatic composition prior to cutting. Alternatively, staple fibers such as those which may occur naturally or those cut from continuous lengths of natural or artificial filaments, may be treated with a dispersion of the antistatic composition, e. g., by spraying while the fibers are being moved on a continuous conveyor beneath the spray, followed by drying the treated fibers. Or, the treatment may be applied during an intermediate stage of the spinning operations, e. g., immediately after lapping, carding, drawing or slubbing; or, the antistatic composition may be applied during fiber-mixing or -blending operations. The staple lengths may range, for example, from ½ to 8 inches or more and in deniers ranging, for instance, from 1 to 30 deniers or more. The short lengths of dried, treated filaments or threads are then subjected to a suitable spinning operation by any of the conventional systems, e. g., the "cotton," the "worsted," the "wool," the "spun silk," etc.

If desired, the antistatic composition which is deposited in or on the treated article may be allowed to remain in place during and after the production of the article in its ultimate form. The antistatic substance may be removed, as desired or as conditions may require, from yarns, fabrics and the like containing the same by means of the usual aqueous scouring baths. The treated fibers or fabrics can be dyed, if desired, without scouring off the antistatic finish prior to dyeing.

The preferred vinyl resin which is subjected to treatment as herein described is polymeric acrylonitrile or thermoplastic copolymeric acrylonitrile containing in its molecules a substantial amount of combined acrylonitrile. Of such copolymeric acrylonitriles, it is preferred to treat an acrylonitrile copolymer containing in the polymer molecules an average of at least about 80% by weight of combined acrylonitrile, e. g., from about 85% to about 99.5% by weight of combined acrylonitrile. In such copolymeric products, the proportions of monomers in the polymerizable mixture from which the copolymers are made are preferably adjusted so that the final copolymer contains in the molecules thereof an average of at least about 80% by weight of acrylonitrile (combined acrylonitrile). Hence, the expression "acrylonitrile polymerization product containing in the molecules thereof at least about 80% by weight of combined acrylonitrile" means a polymerization product (polymer, copolymer or interpolymer or mixture thereof) containing in its molecules an average of at least about 80% by weight of the acrylonitrile unit, which is considered to be present in the individual polymer molecule as the group

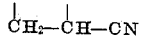

or, otherwise stated, at least about 80% by weight of the reactant substance converted into and forming the polymerization product is acrylonitrile (combined acrylonitrile).

The use of antistatic compositions of the kind with which this invention is concerned in the treatment of, for example, wool, nylon, silk, viscose and acetate rayons, vinyl resins, etc., to obviate or lessen the tendency of such materials to accumulate charges of electricity thereon has numerous advantages, among which may be mentioned their ease of application (e. g., as aqueous dispersions, at any pH, in the cold, or warm, or at the boil); the fact that they are chemically stable to aging; the fact that they do not form insoluble compounds or bodies in dispersions thereof in hard water; their effectiveness both as antistatic agents and in lubricating and softening the shaped article in yarn or other form, whereby the treated yarn, film or other article is rendered more amenable to further processing or fabricating (e. g., weaving, knitting, etc., in the case of yarns); the fact that, even though they contain an antistatic inorganic salt which normally might tend to deposit large, sharp crystals having an abrasive effect upon the treated article, the composition does not physically damage or have any other deleterious effect upon the fiber, fabric or other article to which it has been applied; their compatibility with other conditioning agents commonly employed in finishing compositions used in treating fibers and other shaped articles; their ease of removal from the treated article, when such removal appears to be desirable for subsequent processing or use of the article; their non-harmful effect upon the vinyl resin or other material which is subjected to treatment; as well as other advantages.

The term "yarn" as used generically herein includes within its meaning a single filament, a plurality of filaments associated into the form of a thread and which may be of any desired twist, single or multiple threads associated or twisted together, as well as staple fibers produced from filaments or threads and spun yarn produced from such staple fibers. The term "fiber" as used generically herein includes both monofilaments and multifilaments.

In order that those skilled in the art may better understand how the present invention can be carried into effect, the following examples are given by way of illustration and not by way of limitation. All parts and percentages are by weight.

EXAMPLE 1

This example illustrates the use of the sodium bisulfite-addition product of the condensation product of glyceryl monostearate and polypropylene glycol 1200 dimaleate in an antistatic composition which contains magnesium nitrate as an antistatic inorganic salt. This bisulfite-addition product can be prepared, for example, as follows:

A. *Preparation of the dimaleate ester of polypropylene glycol 1200*

Maleic anhydride, 65.5 g. (0.67 mole), and polypropylene glycol 1200, 400 g. (0.33 mole), are placed in a one-liter, three-nick flask fitted with a condenser, stirrer, thermometer, and nitrogen-inlet tube. The temperature is raised to 135–140° C. and maintained there for one hour. The product, a pale yellow, viscous liquid, has an acid number of 78.7 (calc'd 80.3).

B. *Condensation of the dimaleate ester of polypropylene glycol 1200 and glyceryl monostearate*

Polypropylene glycol 1200 dimaleate, 465.5 g. (0.327 mole, based on acid number), glyceryl monostearate, 228 g. (0.655 mole), and 75 ml. xylene are placed in a two-liter, three-neck flask fitted with a water trap, condenser, stirrer, thermometer, and nitrogen-inlet tube. The temperature is raised to 195–200° C. and maintained there for 5½ hours. At the end of this period 10.5 ml. (89%) of water of reaction has been collected. The xylene is removed by distillation under reduced pressure. The product, a pale tan, waxy solid, has an acid number of 7.7.

C. *Sulfonation of the condensation product of polypropylene glycol 1200 dimaleate and glyceryl monostearate*

The product prepared in B, 702 g., $Na_2SO_3$, 13.1 g. (0.104 mole), denatured ethanol, 788 g., and water, 200 g., are placed in a three-liter, three-neck flask fitted with a condenser and stirrer. Heating is by means of steam bath. After 15 minutes' refluxing, $Na_2S_2O_5$, 57.0 g. (0.300 mole), is added. The mixture is maintained at reflux for 22 hours. At the end of this period the sulfonation is 100% complete. The excess bisulfite is oxidized to bisulfate with hydrogen peroxide. The pH is raised to 6.0–6.5 by the addition of sodium hydroxide solution. The mixture is stripped to 90% solids. The product is a tan, waxy solid.

A liquid antistatic composition containing 1.5% of solids is prepared as follows:

To 588 parts of water at 120° F. is added 3 parts of the bisulfite-addition product of C. The mixture is stirred until the solid is completely dispersed, after which 10.4 parts of $Mg(NO_3)_2.6H_2O$ is added and stirring is continued until a substantially uniform dispersion has been produced.

Thirty (30) parts of dry, staple synthetic fiber (3 denier, 4½ inches average length), more particularly a fiber formed of a copolymer of about 95% acrylonitrile and 5% methyl acrylate, is immersed in this dispersion. After 10 minutes' immersion in the 120° F. dispersion, the staple is hydroextracted to contain a weight of solvent which is about equal to the weight of the dry staple. It is then dried for 2 hours at 150° F.

When the dried, treated staple is pulled through combs or stroked with metal, glass or plastic combs, there is no evidence of the accumulation of static charges of electricity on the staple. The treated staple is heated for an additional 2 hours at 200° F. When similarly tested by combing or stroke tests immediately after removal from the oven or after conditioning for 24 hours at 25° C., 50% R. H., there is still no evidence of electrostatic charges on the staple. Furthermore, even after 2 months' storage of the treated staple, there is no loss in its antistatic characteristics.

When the untreated staple is subjected to these same stroking and combing tests, it develops a high electrostatic charge and cannot be processed satisfactorily on textile equipment.

EXAMPLE 2

This example illustrates the use of the sodium bisulfite-addition product of the condensation product of glyceryl monostearate and polyethylene glycol 400 dimaleate in an antistatic composition which contains magnesium nitrate as an antistatic inorganic salt. This bisulfite-addition product can be prepared in accordance with the same general procedure given under Example 1 with reference to the preparation of a different bisulfite-addition product. For additional details see some of the examples in the aforementioned Carnes et al. copending application Serial No. 308,940, for instance Example 5.

A liquid antistatic composition containing 3% solids is prepared as follows: 12 parts of the above-described bisulfite-addition product is added to 578 parts of water at 120° F., and the mixture is stirred until a substantially uniform dispersion has been obtained. Ten and four-tenths (10.4) parts of $Mg(NO_3)_2.6H_2O$ is now added, and stirring is continued until the composition is substantially uniform.

A swatch (10 parts) of fabric, square weave (40 x 46), that had been woven from staple fiber of a copolymer of acrylonitrile of the kind described more particularly in Example 1, is immersed in the 120° F. liquid antistatic composition for 1 minute, and is then passed through a pad-mangle adjusted to 100% wet-pickup. The treated fabric is dried for 5 minutes at 250° F. No static effect is observed when dried, treated fabric is hand-stroked with a glass, metal or plastic rod. In marked contrast the untreated fabric, when similarly stroked, shows considerable accumulation of electrostatic charges.

EXAMPLE 3

This example illustrates the use of the sodium bisulfite-addition product of the condensation product of glyceryl monostearate and polyethylene glycol 600 dimaleate in an antistatic composition which contains magnesium nitrate as the antistatic inorganic salt. This bisulfite-addition product can be prepared in accordance with the same general procedure given under Example 1 with reference to the preparation of a different bisulfite-addition product. For additional details see some of the examples in the aforementioned Carnes et al. copending application Serial No. 308,940, for instance Example 6.

A liquid antistatic composition containing 2% solids is prepared as follows: 6 parts of the above-described bisulfite-addition product is added to 584 parts of water heated to 120° F. The mixture is stirred until the solid is completely dispersed, after which 10.4 parts of $$Mg(NO_3)_2.6H_2O$$

is added and stirring is continued until a substantially uniform dispersion has been produced.

A swatch (20 parts) of fabric formed of Vinyon N (a copolymer of about 60% vinyl chloride and about 40% acrylonitrile) is immersed in the 120° F. liquid antistatic composition for 1 minute, and is then passed through a pad-mangle adjusted to 100% wet-pickup. The treated fabric is dried at 110° F. for 1 hour. No static effect occurs when the dried, treated fabric is hand-stroked with a glass, metal or plastic rod. In marked contrast the untreated fabric accumulates static charges of electricity when similarly stroked or by merely waving it in the air.

EXAMPLE 4

Example 3 is repeated, but substituting a swatch of nylon fabric for the swatch of Vinyon N fabric. The dried, treated nylon fabric accumulates no observable charge of static electricity when hand-stroked as described in Example 3, whereas the untreated fabric accumulates electrostatic charges upon hand-stroking with a glass, metal or plastic rod.

EXAMPLE 5

This example illustrates the treatment of Dacron fibers. Dacron is a trade name for fibers formed of polymeric ethylene glycol terephthalate. It is a polyester condensation polymer.

Thirty (30) parts of dry Dacron staple (3 denier, 2½ inches in average length) is immersed in a liquid antistatic composition containing 2% of solids and which is prepared as follows:

To 588 parts of water at 120° F. is added 3 parts of the same sodium bisulfite-addition product described in Example 2, and the mixture is stirred until a substantially uniform dispersion has been obtained. Thereafter, 10.4 parts of $Mg(NO_3)_2 \cdot 6H_2O$ is added and stirring is continued until the composition is substantially uniform.

After ten minutes' immersion in the aforementioned dispersion at 120° F., the staple is hydroextracted to contain a weight of solvent which is approximately equal to the weight of the undried staple. The treated staple is then dried for 2 hours at 150° F. When the dried, treated staple is stroked with metal, glass or plastic combs there is no evidence of the accumulation of static charges of electricity. In marked contrast, the untreated Dacron staple fibers, when similarly combed, balloon, flow apart and adhere to the comb.

EXAMPLE 6

Example 5 is repeated, but instead of using Dacron staple fibers there is used 30 parts of Orlon staple which is formed of a homopolymer of acrylonitrile. Substantially the same results are obtained.

EXAMPLE 7

Ten (10) parts of woolen flannel are impregnated by immersion in the same liquid antistatic composition described in Example 5, after which the flannel is passed through squeeze rolls so adjusted as to give 100% wet-pickup. After drying the wet, impregnated flannel for ten minutes at 250° F., it is rubbed with a plastic rod. After rubbing, the flannel shows no evidence of accumulating electrostatic charges when tested by bringing carbon black particles in close proximity thereto. The untreated woolen flannel, on the other hand, shows the accumulation of charges of static electricity when similarly stroked and tested.

EXAMPLE 8

Example 7 is repeated but using (1) medium weight rayon suiting and (2) an acetate rayon fabric as the materials to which the antistatic composition is applied instead of woolen flannel. The results are substantially the same as those described in Example 7.

When a solution of magnesium nitrate alone is applied to an acetate rayon fabric, it stiffens the fabric considerably.

EXAMPLE 9

A liquid antistatic composition containing about 1.5% solids is prepared as follows:

To 588 parts of water at 120° F. is added 6 parts of the sodium bisulfite-addition product of the condensation product of glyceryl monostearate and polyethylene glycol 400 dimaleate (see Example 2). The mixture is stirred until a substantially uniform dispersion has been obtained, after which 3 parts of strontium chloride is added and stirring is continued until the composition is substantially uniform.

Thirty (30) parts of dry staple fiber (3 denier, 1½ inches in average length formed of a copolymer of about 95% acrylonitrile and 5% methyl acrylate is immersed for 10 minutes in the 120° F. liquid antistatic composition. The wet, treated staple is squeezed by hand to a 200% wet-pickup, after which it is dried for 4 hours at 150° F. Static control as measured by combing or stroking tests, such as have been described hereinbefore, or by tumbling, is excellent. In marked contrast, the untreated staple rapidly accumulates and retains electrostatic charges when similarly tested.

Similar results are obtained when 3 parts of one of the following salts is substituted for 3 parts of strontium chloride in the above antistatic composition:

Aluminum chloride  
Magnesium chloride  
Strontium nitrate  
Zinc chloride  
Calcium chloride  
Lithium fluoride These and other inorganic antistatic salts, including strontium chloride, or mixtures thereof, also may be used instead of magnesium nitrate in any of Examples 1 to 8, inclusive.

EXAMPLE 10

Liquid antistatic compositions each containing about 1.5% solids are prepared in exactly the same manner described in Example 9 with the exception that, instead of using 3 parts of strontium chloride, there is used in the individual composition 3 parts of calcium nitrate, lithium nitrate, aluminum nitrate, sodium nitrite and sodium chloride.

A swatch (10 parts) of fabric formed of cellulose acetate rayon is immersed in each dispersion of the antistatic composition at 120° F. for 1 minute, and is then passed through a pad-mangle adjusted to 100% wet-pickup. The impregnated fabrics are dried for 5 minutes at 250° F. No static effect occurs when the dried, treated fabrics are stroked with a glass, metal or plastic rod. In marked contrast the untreated fabrics accumulate static charges of electricity when similarly stroked.

EXAMPLE 11

This example illustrates the use of the antistatic compositions herein involved in the final rinse in dry-cleaning operations.

A swatch (10 parts) of fabric, square weave (40 x 46), that had been woven from staple fibers of a copolymer of acrylonitrile of the kind described more particularly in Example 1, is immersed in a solvent solution which is prepared as follows:

Four (4) parts of the sodium bisulfite-addition product of glyceryl monostearate and polyethylene glycol 400 dimaleate of the kind described in Example 2 and 4 parts of $Mg(NO_3)_2 \cdot 6H_2O$ are dissolved in 50 parts of isopropanol. To the resulting solution is added 42 parts of perchloroethylene. The fabric is immersed in the solvent mix for 5 minutes and is then passed through squeeze rolls to remove the excess solvent. The treated fabric is then dried in a steam-heated oven at 140° F. for 4 hours. The dried fabric is free from static when subjected to stroking and combing tests of the kind described in the previous examples. On the other hand, the untreated fabric accumulates electrostatic charges when similarly tested.

EXAMPLE 12

Example 11 is repeated but using rayon challis, wool and viscose suiting as the fabrics which are subjected to the described treatment. In each case the dried, treated fabrics show no accumulation of static charges of electricity when tested by means of the aforedescribed stroking and combing tests.

The preferred inorganic salts used in producing the antistatic compositions herein involved are those water-soluble inorganic salts, the polarizability of the cation of which is not more than $12 \times 10^{-25}$ cc. Examples of such salts are:

Magnesium nitrate
Magnesium chloride
Magnesium chromate (used under acid conditions, e. g., a pH of about 4.0)
Magnesium acid phosphate (used under acid conditions, e. g., a pH of about 4.0)
Strontium nitrate
Strontium chloride
Aluminum nitrate
Aluminum chloride
Calcium nitrate
Zinc chloride
Calcium chloride
Sodium chloride
Sodium nitrite
Lithium nitrate
Lithium fluoride In connection with the polarizability of the cation of the preferred salts mentioned above, attention is directed to the following definition of polarizability of an ion and brief discussion of the same:

The polarizability of an ion properly may be described as its ability to adjust its electron distribution to the electrical forcefields of its environment; or, it also may be defined as a measure of the deformability of the electron cloud of an ion induced by an electromagnetic forcefield. A surface has a symmetrical forcefield. When a highly polarizable cation is adsorbed on a surface, the electron distribution of the cation becomes asymmetrical. For instance, the electron distribution of a lead cation adsorbed on soft glass is so changed that electrons are repelled from the surface. This makes the ultimate surface resemble that of metallic lead. The surface is hydrophobic. Ions of low polarizability are not sensitive to the asymmetrical forcefield, do not develop an asymmetrical electron distribution and, therefore, do not inhibit the surface forces from attracting water molecules. The polarizabilities of some of the component ions of salts can be found in Landolt-Börnstein, 6th ed., vol. I, part 1, page 401, published in 1950 by Springer-Verlag (Berlin). Other polarizabilities not given in this publication can be estimated from the atomic refractions which are given in this publication. It will be clear from the data and other information given in this publication, and from the foregoing brief discussion, as to the meaning of the expression appearing herein that limits the antistatic inorganic salt ingredient of the composition to those wherein the polarizability of the cation component thereof is not more than $12 \times 10^{-25}$ cc.

The inorganic salts used in producing the antistatic compositions herein involved are those soluble inorganic salts which function as antistatic agents for the base material which is treated with the antistatic composition and which normally are deposited in the form of relatively large crystals (e. g., from 10 to 15 microns, and larger, in average particle size) upon volatilization of the solvent in which the particular salt is dissolved, e. g., water. The crystal growth-inhibiting agents employed in producing the antistatic compositions herein involved are capable of either preventing the deposition of such crystals completely or of controlling or modifying the crystal deposition or formation so that perceptible crystals having a maximum average particle size of about 5 microns are present in the composition. As has been indicated hereinbefore, particles of this size are near the lower limit of the resolving power of light microscopes.

It will be understood, of course, by those skilled in the art that my invention is not limited to the specific antistatic compositions described in the above illustrative examples, or to their use in the manner and to the particular base materials described by way of illustration in these examples, since other compositions of the kind described in the portion of this specification prior to and after the examples can be used in treating textile and other materials or articles which, in a dry state, normally tend to accumulate static charges of electricity. Thus, instead of the particular bisulfite-addition product employed in the individual examples, I may use any other such product of the kind described herein and more fully in the aforementioned Carnes et al. copending application Serial No. 308,940. Likewise antistatic inorganic salts other than those employed in the various examples and mentioned elsewhere herein can be used in forming the antistatic compositions of the present invention.

The antistatic compositions of this invention are effective not only in improving the useful properties of textile fibers and fabrics which, in a dry state, normally accumulate static charges of electricity, but also various other shaped or formed articles, e. g., phonograph records made of vinyl resins, vinyl or other plastic materials in sheet or film form, photographic films formed of a cellulose ester or other material that tends to accumulate an electrostatic charge, etc.

I claim:

1. An antistatic composition comprising (I) an antistatic agent which is a soluble inorganic salt that normally is deposited in the form of relatively large crystals upon volatilization of the solvent in which it is dissolved and (II) a salt which is an addition product of (1) a bisulfite and (2) a polyester which is a condensation product of (A) a glycerol ester selected from the class consisting of fatty acid monoglycerides, fatty acid diglycerides and mixtures thereof, wherein the fatty acid component thereof contains at least 8 carbon atoms, with (B) an esterification product of (a) an aliphatic dihydroxy compound selected from the class consisting of alkylene glycols and polyoxyalkylene glycols and (b) an ethylenically unsaturated dicarboxylic compound selected from the class consisting of ethylenically unsaturated dicarboxylic acids and anhydrides thereof, the ethylenically unsaturated grouping of the said dicarboxylic compound being alpha to a carbonyl group, the reactants of (A) and (B) being employed in a molar ratio of about 2 moles of the former to 1 mole of the latter, the reactants of (a) and (b) being employed in a molar ratio of 1 mole of the former to about 2 moles of the latter, and the ingredients of (I) and (II) being present in the said antistatic composition in weight percentages of from about 5 to 97% of the former to from about 95 to 3% of the latter.

2. An antistatic composition as in claim 1 wherein the inorganic salt of (I) is magnesium nitrate.

3. An antistatic composition as in claim 1 wherein the salt of (II) is an addition product of (1) a bisulfite and (2) a polyester which is a condensation product of (A) a glyceryl ester comprising glyceryl monostearate and (B) a polyethylene glycol dimaleate comprising mainly nonaethylene glycol dimaleate, the reactants of (A) and (B) being employed in a molar ratio of about 2 moles of the former to 1 mole of the latter.

4. An antistatic composition as in claim 1 wherein the salt of (II) is an addition product of a bisulfite of an organic base and a polyester of the kind defined under (2) of claim 1.

5. An antistatic composition as in claim 1 wherein the salt of (II) is an addition product of a bisulfite of an inorganic base and a polyester of the kind defined under (2) of claim 1.

6. An antistatic composition as in claim 1 wherein the salt of (II) is an addition product of sodium bisulfite and a polyester of the kind defined under (2) of claim 1.

7. An antistatic composition as in claim 1 wherein the glycerol ester of (A) that is used in making the polyester of (2) is a fatty acid monoglyceride wherein the fatty acid component thereof contains at least 8 carbon atoms.

8. An antistatic composition as in claim 1 wherein the aliphatic dihydroxy compound of (a) that is used in making the esterification product of (B) is an alkylene glycol.

9. An antistatic composition as in claim 1 wherein the aliphatic dihydroxy compound of (a) that is used in making the esterification product of (B) is a polyoxyalkylene glycol.

10. An antistatic composition as in claim 1 wherein the dicarboxylic compound of (b) that is used in making the esterification product of (B) is maleic anhydride.

11. A liquid antistatic composition comprising an aqueous dispersion of the salts defined in (I) and (II) of claim 1 and in the weight percentages, with respect to each other, that are there set forth.

12. A paste-like material which is dilutable with water to form a substantially homogeneous, liquid, antistatic composition and which comprises the salts defined in (I) and (II) of claim 1 and in the weight percentages, with respect to each other, that are there set forth, the aforementioned salts and water being present in the said paste-like material in weight percentages of from about 20% to about 65% of the former to from about 80% to about 35% of the latter.

13. An antistatic composition especially adapted for imparting antistatic and softening characteristics to textiles and which comprises (I) magnesium nitrate and (II) a salt which is an addition product of (1) a water-soluble bisulfite of an inorganic base and (2) a polyester which is a condensation product of (A) a glyceryl ester comprising glyceryl monostearate and (B) a polyethylene glycol dimaleate comprising mainly nonaethylene glycol dimaleate, the reactants (A) and (B) being employed in a molar ratio of about 2 moles of the former to 1 mole of the latter, and the ingredients of (I) and (II) being present in the said antistatic composition in weight percentages of from about 5 to 97% of the former to from about 95 to 3% of the latter.

References Cited in the file of this patent

UNITED STATES PATENTS 2,086,544     Dreyfus  ---------------- July 13, 1937